United States Patent
Feng et al.

(10) Patent No.: US 11,841,436 B2
(45) Date of Patent: Dec. 12, 2023

(54) CONTAINER POSITIONING METHOD AND APPARATUS BASED ON MULTI-LINE LASER DATA FUSION

(71) Applicant: Shanghai Master Matrix Information Technology Co., Ltd., Shanghai (CN)

(72) Inventors: Zhi Feng, Shanghai (CN); Hao Liang, Shanghai (CN); Huan Chen, Shanghai (CN)

(73) Assignee: Shanghai Master Matrix Information Technology Co., Ltd., Shanghai (CN)

( * ) Notice: Subject to any disclaimer, the term of this patent is extended or adjusted under 35 U.S.C. 154(b) by 0 days.

(21) Appl. No.: 18/023,938

(22) PCT Filed: Sep. 12, 2021

(86) PCT No.: PCT/CN2021/117872
§ 371 (c)(1),
(2) Date: Feb. 28, 2023

(87) PCT Pub. No.: WO2022/057747
PCT Pub. Date: Mar. 24, 2022

(65) Prior Publication Data
US 2023/0324554 A1 Oct. 12, 2023

(30) Foreign Application Priority Data
Sep. 17, 2020 (CN) .......................... 202010977538.3

(51) Int. Cl.
*G01C 3/08* (2006.01)
*G01S 17/89* (2020.01)
(Continued)

(52) U.S. Cl.
CPC .............. *G01S 17/89* (2013.01); *G01S 7/497* (2013.01); *G06T 7/13* (2017.01); *G06T 7/73* (2017.01); *G06T 2207/10028* (2013.01)

(58) Field of Classification Search
CPC . G01S 17/89; G01S 7/497; G06T 7/13; G06T 7/73; G06T 2207/10028
See application file for complete search history.

(56) References Cited

U.S. PATENT DOCUMENTS

| | | | |
|---|---|---|---|
| 2014/0267703 A1* | 9/2014 | Taylor | .................. G05D 1/0234 348/139 |
| 2020/0410690 A1* | 12/2020 | Zeng | ................... G06F 18/2323 |
| 2021/0356261 A1 | 11/2021 | Jin et al. | |

FOREIGN PATENT DOCUMENTS

| | | |
|---|---|---|
| CN | 206019594 U | 3/2017 |
| CN | 108955685 A | 12/2018 |

(Continued)

OTHER PUBLICATIONS

Brena, Romon F. et al. "Choosing the Best Sensor Fusion Method: A Machine-Learning Approach". National Library of Medicine. Published online Apr. 20, 2020. https://www.ncbi.nlm.nih.gov/pmc/articles/PMC7219245/ (Year: 2020).*

(Continued)

*Primary Examiner* — Samantha K Nickerson
(74) *Attorney, Agent, or Firm* — NSIP Law

(57) ABSTRACT

The present disclosure discloses a container positioning method and apparatus based on multi-line laser data fusion, the method comprising: acquiring point cloud data of at least two multi-line laser radars, and performing point cloud data fusion according to a coordinate system relationship between the at least two laser radars; performing clustering of scanning lines according to the fused point cloud data, and acquiring an edge point of a top surface or a side surface of a target container according to the clustered scanning lines; acquiring a contour of the top surface or the side surface of the target container according to the edge point of the top surface or the side surface of the target container to determine a central point and a heading angle of the target (Continued)

acquiring point cloud data of at least two multi-line laser radars, and performing point cloud data fusion according to a coordinate system relationship between the at least two laser radars — 101 performing clustering of scanning lines according to the fused point cloud data, and acquiring an edge point of a top surface or a side surface of a target container according to the clustered scanning lines — 102 acquiring a contour of the top surface or the side surface of the target container according to the edge point of the top surface or the side surface of the target container to determine a central point and a heading angle of the target container so as to determine a position of the target container — 103 container so as to determine a position of the target container. The container positioning method and apparatus based on multi-line laser data fusion provided in the present disclosure acquire an edge point of a top surface or a side surface of a target container after point cloud data is fused via point cloud data of a multi-line laser radar, so as to accurately acquire the position of the target container.

8 Claims, 4 Drawing Sheets

(51) Int. Cl.
*G06T 7/73* (2017.01)
*G06T 7/13* (2017.01)
*G01S 7/497* (2006.01)

(56) References Cited

FOREIGN PATENT DOCUMENTS

| CN | 109410183 | 3/2019 |
| CN | 110579750 | 12/2019 |
| CN | 110865388 | 3/2020 |
| CN | 110889831 | 3/2020 |
| CN | 111115300 | 5/2020 |
| CN | 111175725 | 5/2020 |
| CN | 111288930 | 6/2020 |
| CN | 111366938 | 7/2020 |
| CN | 111830526 | 10/2020 |
| JP | 2006312521 A | 11/2006 |
| KR | 20190049221 | 5/2019 |

OTHER PUBLICATIONS

International Search Report and Written Opinion for International Application No. PCT/CN2021/117872, dated Dec. 7, 2021, 8 pages.
Chinese Office Action for Chinese Application No. 202010977538.3, dated Nov. 2, 2020, 9 pages.
Chinese Office Action for Chinese Application No. 202010977538.3, dated Nov. 23, 2020, 11 pages.
Notification of Grant of Invention Patent for Chinese Office Action for Chinese Application No. 202010977538.3, dated Nov. 30, 2020, 2 pages.

* cited by examiner

CONTAINER POSITIONING METHOD AND APPARATUS BASED ON MULTI-LINE LASER DATA FUSION

CROSS-REFERENCE TO RELATED APPLICATIONS

This is a National Phase Application of International Application No. PCT/CN2021/117872, filed Sep. 12, 2021, which claims priority to Chinese Application No. 202010977538.3, filed Sep. 17, 2020. The disclosure of each of these applications is incorporated herein by reference in its entirety for all purposes.

TECHNICAL FIELD

The present disclosure relates to the field of crane handling, and more particularly to a container positioning method and apparatus based on multi-line laser data fusion.

BACKGROUND ART

At present, the harbor often uses manual work to load and unload the pickup tank, and the driver of the tire crane operates the tire crane to load and unload the pickup tank (inner pickup tank and outer pickup tank) below it. The disadvantages of manual work by the tire crane driver are low work efficiency and unstable work quality. With the progress and development of technology, more and more high-tech technologies are applied to docks, automation and intelligence gradually become the trend of future port development. As a scanning method, laser radar is widely used in port field. However, most of laser radar used in port field is single-point laser radar or single-line laser radar. Single-point laser radar or single-line laser radar can only be used to realize the function of ranging and anti-collision for target containers. Single-point laser radar or single-line laser radar cannot realize the accurate positioning of containers.

It would therefore be desirable to provide a method for positioning a container that enables accurate positioning of a target container.

SUMMARY OF THE INVENTION

The technical problem to be solved by the present disclosure is to provide a container positioning method and apparatus based on multi-line laser data fusion, wherein an edge point of a top surface or a side surface of a target container is acquired after point cloud data is fused via point cloud data of a multi-line laser radar, so as to accurately acquire the position of the target container.

The technical solution adopted by the present disclosure to solve the above-mentioned technical problem is to provide a container positioning method based on multi-line laser data fusion, comprising:
acquiring point cloud data of at least two multi-line laser radars, and performing point cloud data fusion according to a coordinate system relationship between the at least two laser radars;
performing clustering of scanning lines according to the fused point cloud data, and acquiring an edge point of a top surface or a side surface of a target container according to the clustered scanning lines;
acquiring a contour of the top surface or the side surface of the target container according to the edge point of the top surface or the side surface of the target container to determine a central point and a heading angle of the target container so as to determine a position of the target container.

Preferably, a contour of the top surface of the target container is acquired according to a length, width, height of the target container and a single-sided edge point of the top surface of the target container when part of the top surface of the target container is unavailable; and
a contour of the side surface of the target container is acquired according to the width, length, height of the target container and the edge point of the side surface of the target container when entire of the top surface of the target container is unavailable.

Preferably, when the at least two multi-line laser radars scan contours of a plurality of containers, a position of the target container is determined according to a arrangement and a floor height where the target container is located.

Preferably, a point cloud ROI is selected according to a pre-estimated position of the target container, and point cloud data obviously not hit on the target container is removed; and
the point cloud data in a region of the point cloud ROI is clustered according to a width, length and height of the target container to obtain a laser line hitting the top surface or the side surface of the target container in the region of the point cloud ROI.

Preferably, the clustered scanning lines intersect with a long side of the top surface of the target container to obtain a first group of edge points and/or a second group of edge points, the clustered scanning lines intersect with a short side of the top surface of the container to obtain a third group of edge points and/or a fourth group of edge points, the first group of edge points and/or the second group of edge points being at least two, and the third group of edge points and/or the fourth group of edge points being at least one; or
the clustered scanning lines intersect with the side surface of the target container to obtain a fifth group of edge points and/or a sixth group of edge points, the clustered scanning lines intersect with a bottom surface of the target container to obtain a seventh group of edge points, and the fifth group and/or sixth group of edge points being at least one, and the seventh group of edge points being at least two.

Preferably, the first group of edge points and/or the second group of edge points are fitted with a straight line to obtain the heading angle of the target container or the seventh group of edge points are fitted with a straight line to obtain the heading angle of the target container.

Preferably, the at least two multi-line laser radars are three-dimensional laser radars mounted on a cart.

Preferably, the at least two multi-line laser radars are angled with each other to enable scanning of the target container from a lateral direction and a longitudinal direction, respectively.

Preferably, the method further comprises:
calibrating the at least two multi-line laser radars, the at least two multi-line laser radars respectively scanning two surfaces, perpendicular to each other, of the target container, obtaining two dimensions of a rotation relationship and a displacement relationship of the at least two multi-line laser radars by fitting the two surfaces perpendicular to each other, and obtaining a third dimension by measuring a position relationship of the at least two multi-line laser radars.

The technical solution also adopted by the present disclosure in order to solve the above-mentioned technical problem is to further provide a container positioning apparatus based on multi-line laser data fusion, using the container positioning method based on multi-line laser data fusion described above.

The present disclosure has the following advantageous effects compared to the prior art: the container positioning method and apparatus based on multi-line laser data fusion provided by the present disclosure can acquire point cloud data of at least two multi-line laser radars and perform point cloud data fusion, perform scanning line clustering according to the fused point cloud data and acquire edge points and contours of a top surface or a side surface of a target container, so as to determine a central point and a heading angle of the target container, and then determine the position of the target container, thereby achieving accurate positioning of the target container.

Further, depending on the length, width, height of the target container, and a single-sided edge point of the top surface and the contour of the top surface or an edge point of the side surface and the contour of the side surface of the target container, accurate positioning of the target container can be achieved when the top surface of the target container is partially or completely unavailable.

Further, at least two multi-line laser radars are angled to enable scanning of the target container from a lateral direction and a longitudinal direction, respectively, so that edge points and contours of the target container are completely scanned, enabling accurate positioning of the target container.

DETAILED DESCRIPTION OF THE INVENTION

The disclosure will now be further described with reference to the accompanying drawings and embodiments.

In the following description, numerous specific details are set forth in order to provide a thorough understanding of the present disclosure. However, it will be apparent to one of ordinary skill in the art that the present disclosure may be practiced without these specific details. Therefore, specific details are set forth merely as examples, which can vary from the spirit and scope of the disclosure and are still considered to be within the spirit and scope of the disclosure.

Figure 1:
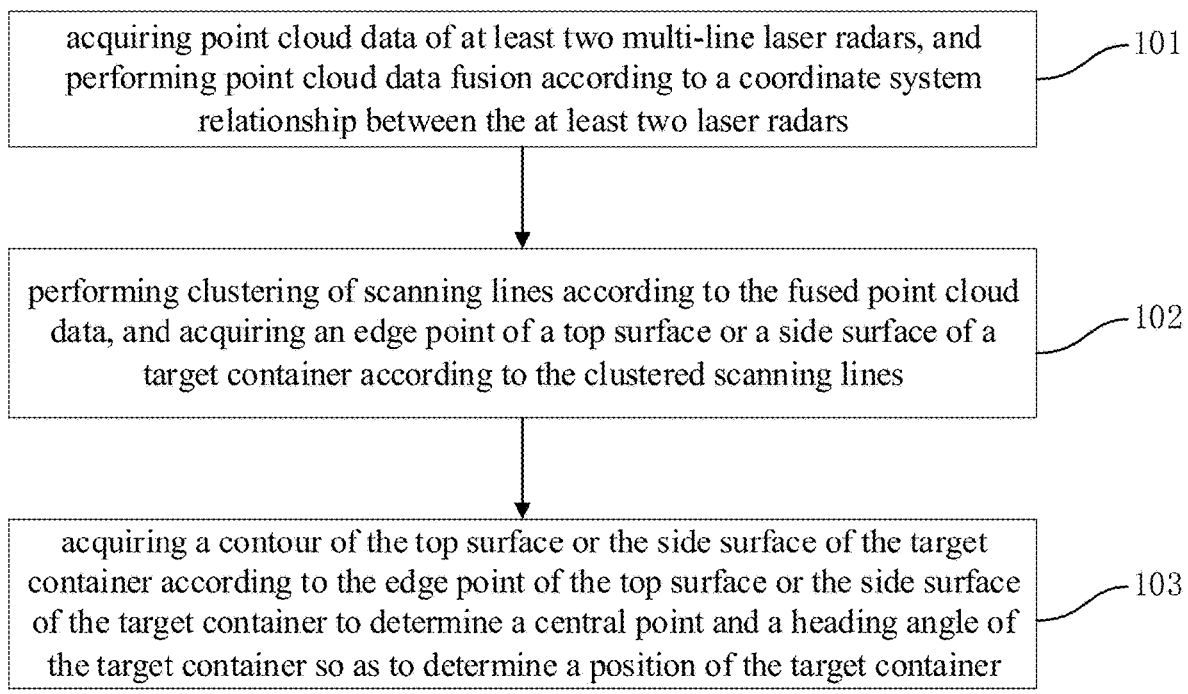
FIG. 1 is a flow chart of a container positioning method based on multi-line laser data fusion according to an embodiment of the present disclosure.

Reference is now made to FIG. 1, which is a flow chart of a container positioning method based on multi-line laser data fusion according to an embodiment of the present disclosure. A container positioning method based on multi-line laser data fusion comprises the steps of:

step 101: acquiring point cloud data of at least two multi-line laser radars, and performing point cloud data fusion according to a coordinate system relationship between the at least two laser radars;

step 102: performing clustering of scanning lines according to the fused point cloud data, and acquiring an edge point of a top surface or a side surface of a target container according to the clustered scanning lines;

step 103: acquiring a contour of the top surface or the side surface of the target container according to the edge point of the top surface or the side surface of the target container to determine a central point and a heading angle of the target container so as to determine a position of the target container.

In a specific implementation, the central point of the target container refers to the central point of the rectangular top surface of the container, and the heading angle refers to the angle between the straight line connected by the centers of the head and tail lock buttons of the vehicle plate and the vertical coordinate of the large vehicle coordinate system.

Figure 3:
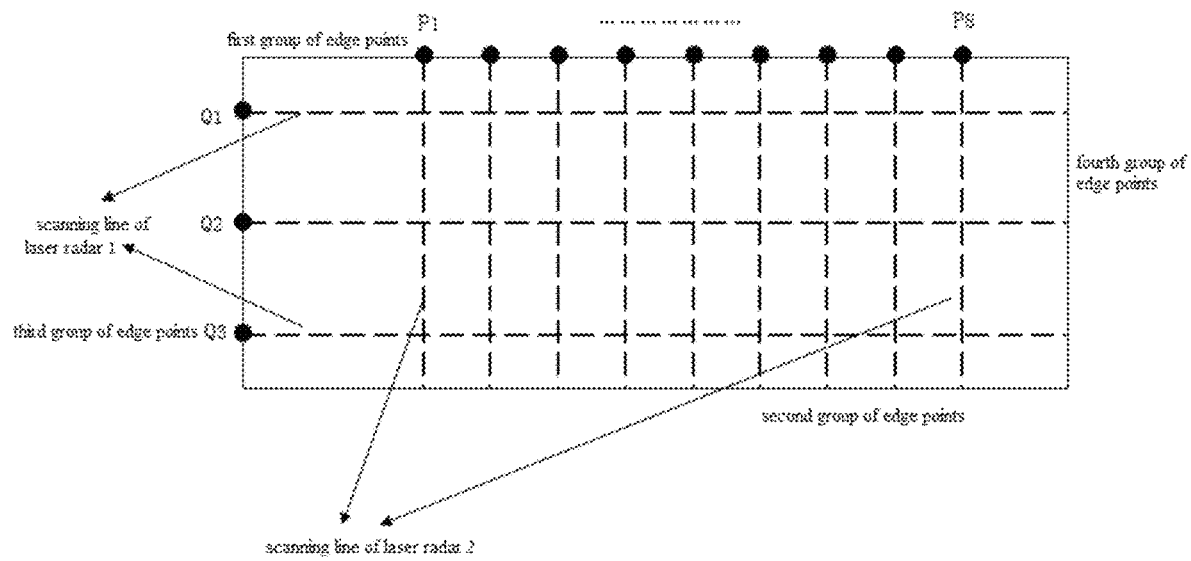
FIG. 3 is a schematic view of the multi-line laser radar scanning the top surface of the target container according to an embodiment of the present disclosure.

Reference is now made to FIG. 3, which is a schematic view of the multi-line laser radar scanning the top surface of the target container according to an embodiment of the present disclosure. In a specific implementation, two multi-line laser radars can be used, for example, a laser radar 1 and a laser radar 2 can be used. The laser radar 1 and the laser radar 2 are multi-line laser radars, the point cloud data of the two multi-line laser radars are placed in the same coordinate system using calibration parameters, and point cloud data fusion is performed according to the coordinate relationship between the laser radar 1 and the laser radar 2. Scanning line is clustered according to the fused point cloud data, wherein the dotted line in the figure is a point cloud where the laser lights of two multi-line laser radars fall on the top surface of the container. The scanning line of the laser radar 2 intersects with one of the long sides of the top surface of the target container to obtain a first group of edge points P1 . . . P8 and/or intersects with another long side to obtain a second group of edge points, and the scanning line of the laser radar 1 intersects with one of the short sides of the top surface of the target container to obtain a third group of edge points Q1 . . . Q3 and/or intersects with another short side to obtain a fourth group of edge points, wherein the first group of edge points and the second group of edge points are at least two, and the third group of edge points and the fourth group of edge points are at least one.

In an implementation, a first group of edge points or a second group of edge points, and a third group of edge points or a fourth group of edge points may be used. Preferably, the first group of edge points and the second group of edge points, and the third group of edge points and the fourth group of edge points may be used simultaneously, and the central point of the target container may be determined more precisely by using the two groups of edge point data of the long sides and the two groups of edge point data of the short sides simultaneously, thereby obtaining the contour of the top surface of the target container more precisely.

In a specific implementation, a point cloud ROI (Region of Interest) is selected according to a pre-estimated position of the target container, and point cloud data obviously not hit on the target container is removed, and the point cloud data in a region of the point cloud ROI is clustered according to a width, length and height of the target container to obtain a laser line hitting the top surface or the side surface of the target container in the region of the point cloud ROI.

The first group of edge points P1 ... P8 and/or the second group of edge points can be fitted with a straight line to obtain the heading angle of the target container Preferably, the first group of edge points and the second group of edge points can be used simultaneously, and the heading angle of the target container can be acquired more accurately by using the two groups of edge point data of the long sides simultaneously, thereby determining the position of the target container more accurately. In particular implementations, the third group of edge points Q1 ... Q3 and/or the fourth group of edge points can be fitted with a straight line to obtain the heading angle of the target container Preferably, the third group of edge points and the fourth group of edge points can be used simultaneously, and the heading angle of the target container can be acquired more accurately by using the two groups of edge point data of the short sides simultaneously, thereby determining the position of the target container more accurately. The contour of the top surface of the target container is determined according to the edge points of the multi-line laser radar on the top surface of the target container and the width and length of the container, and the central position of the target container can be acquired after the contour of the top surface of the target container is determined, thereby determining the position of the target container.

Figure 2:
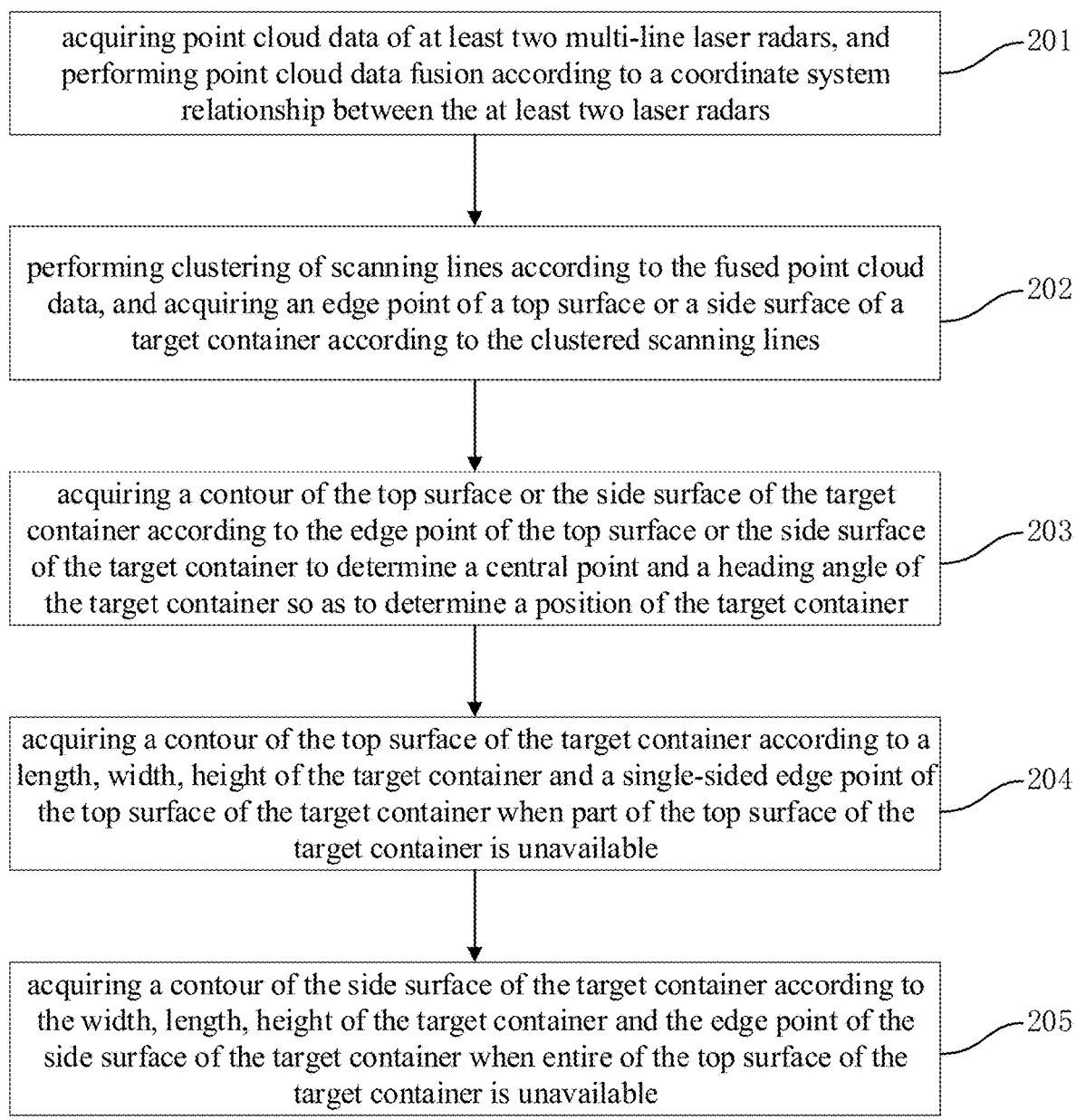
FIG. 2 is a flow chart of a container positioning method based on multi-line laser data fusion according to another embodiment of the present disclosure.

Reference is now made to FIG. 2, which is a flow chart of a container positioning method based on multi-line laser data fusion according to another embodiment of the present disclosure.

A container positioning method based on multi-line laser data fusion comprises the steps of:

step 201: acquiring point cloud data of at least two multi-line laser radars, and performing point cloud data fusion according to a coordinate system relationship between the at least two laser radars;

step 202: performing clustering of scanning lines according to the fused point cloud data, and acquiring an edge point of a top surface or a side surface of a target container according to the clustered scanning lines;

step 203: acquiring a contour of the top surface or the side surface of the target container according to the edge point of the top surface or the side surface of the target container to determine a central point and a heading angle of the target container so as to determine a position of the target container;

step 204: acquiring a contour of the top surface of the target container according to a length, width, height of the target container and a single-sided edge point of the top surface of the target container when part of the top surface of the target container is unavailable; and step 205: acquiring a contour of the side surface of the target container according to the width, length, height of the target container and the edge point of the side surface of the target container when entire of the top surface of the target container is unavailable.

Figure 4:
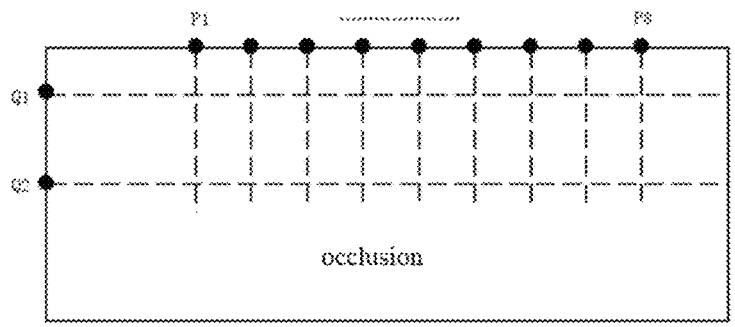
FIG. 4 is a schematic view of the multi-line laser radar scanning the top surface of the target container when part of the top surface of the target container is unavailable according to an embodiment of the present disclosure.

Reference is now made to FIG. 4, which is a schematic view of the multi-line laser radar scanning the top surface of the target container when part of the top surface of the target container is unavailable according to an embodiment of the present disclosure; The first group of edge points P1 ... P8 is acquired by intersecting the laser radar scanning line with a long edge of the top surface of the target container, and a third group of edge points Q1 and Q2 is acquired by intersecting the laser radar scanning line with a short edge of the top surface of the target container and/or a fourth group of edge points is acquired by intersecting the laser radar scanning line with another short edge, wherein the first group of edge points are at least two, and the third group of edge points and the fourth group of edge points are at least one. The contour of the top surface of the target container is thus acquired from the length, width, height of the target container and the single-sided edge points of the top surface of the target container, i.e. the first group of edge points P1 ... P8. In particular implementations, the contour of the top surface of the target container may also be acquired based on the length, width, height of the target container and the third and/or fourth group of edge points.

Preferably, the third group of edge points and the fourth group of edge points can be used simultaneously, and the contour of the top surface of the target container can be acquired more precisely by using the edge point data of the two groups of short sides simultaneously, thereby determining the central point of the target container more precisely.

Figure 5:
FIG. 5 is a schematic view of the multi-line laser radar scanning the side surface of the target container when entire of the top surface of the target container is unavailable according to an embodiment of the present disclosure.

Reference is now made to FIG. 5, which is a schematic view of the multi-line laser radar scanning the side surface of the target container when entire of the top surface of the target container is unavailable according to an embodiment of the present disclosure. A fifth group of edge points and/or a sixth group of edge points are acquired by intersecting the laser radar scanning line with the side surface of the target container, a seventh group of edge points are acquired by intersecting the laser radar scanning line with the bottom surface of the target container, wherein the fifth group and the sixth group of edge points are at least one, and the seventh group of edge points are at least two. The contour of the side surface of the target container is thus acquired from the width, length, and height of the target container and the edge points of the side surface of the target container, i.e. the seventh group of edge points. In particular implementations, the contour of the side surface of the target container may also be acquired based on the length, width, and height of the target container and the fifth and/or sixth group of edge points.

Preferably, the fifth group and the sixth group of edge points can be used simultaneously, and by using the two groups of edge point data of the short sides simultaneously, the contour of the side of the target container can be acquired more precisely, and the central point of the target container can be determined more precisely.

Therefore, even when there is a case where the spreader or a higher-level container at an adjacent position partially or fully occludes the target container, the existence of a single-sided edge point in the long side direction of the target container can be ensured, and the heading angle of the container and the position of the central point can be determined using the single-sided edge point in combination with the width or length of the container.

Figure 6:
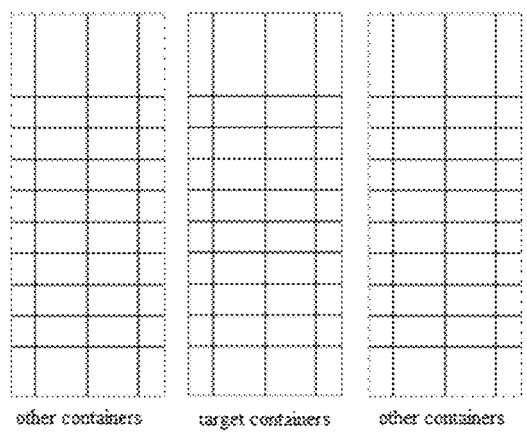
FIG. 6 is a schematic view showing the arrangement of a target container and other containers according to an embodiment of the present disclosure.
Figure 7:
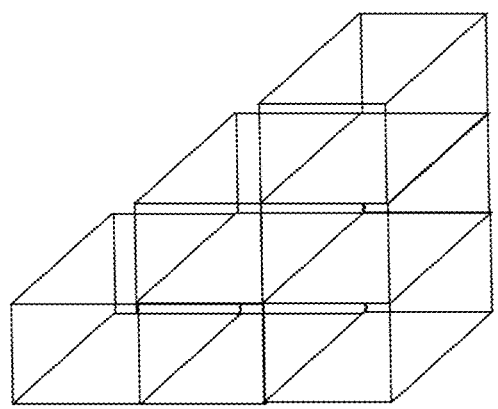
FIG. 7 is a schematic view showing a floor height of the target container according to an embodiment of the present disclosure.
Figure 8:
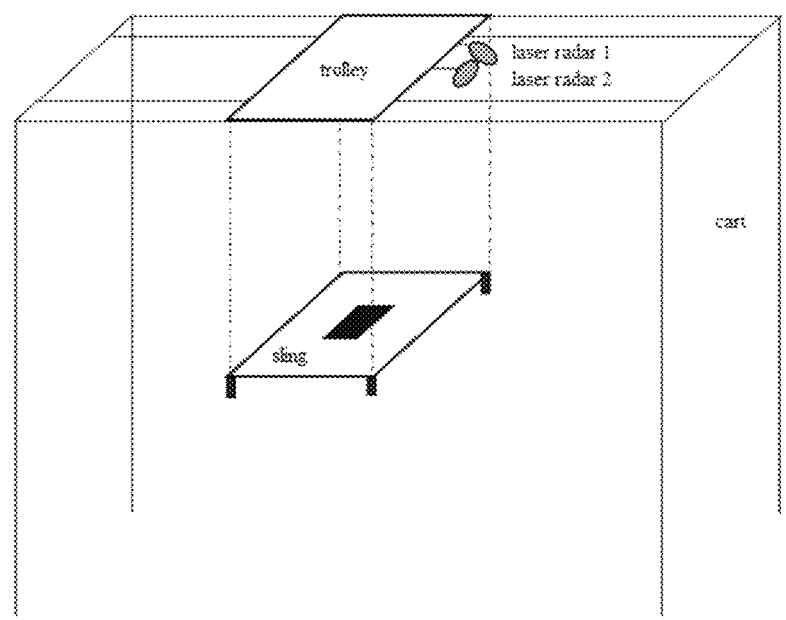
FIG. 8 is a schematic view illustrating the installation of a multi-line laser radar according to an embodiment of the present disclosure.

Reference is now made to FIGS. 6 and 7, where FIG. 6 is a a schematic view showing the arrangement of a target container and other containers according to an embodiment of the present disclosure, and FIG. 7 is a schematic view showing a floor height of the target container according to an embodiment of the present disclosure. When a plurality of containers are detected, the multi-line laser radar scans the contours of the plurality of containers, and it is necessary to distinguish a target container. When a crane grabs a container or places a container, it is usually able to predict and know the rank and floor height of the target container. According to the rank and floor height of the target container, the position of the target container can be determined, and the heading angle and the central position of the target container can be obtained. In a specific implementation, an IPC (Industrial Personal Computer) outputs a control instruction to a PLC (Programmable Logic Controller) to perform grabbing or releasing operation on a target container. Reference is now made to FIG. 8, which is a schematic view illustrating the installation of a multi-line laser radar according to an embodiment of the present disclosure. The at least two multi-line laser radars are three-dimensional laser radars mounted on a trolley, and as shown in FIG. 8, the laser radar 1 and the laser radar 2 are angled to achieve scanning of the target container from a lateral direction and a longitudinal direction, respectively, and the laser radar 1 and the laser radar 2 are preferably placed perpendicularly to each other, so as to facilitate scanning of the target container from the lateral direction and the longitudinal direction using the two multi-line laser radars.

In an implementation, the laser radar may be multiple to more accurately scan the target container. Before using the multi-line laser radar, the multi-line laser radar is also calibrated. The multi-line laser radar respectively scans two surfaces perpendicular to each other of the target container. Two dimensions of the rotation relationship and the displacement relationship of the plurality of multi-line laser radars are acquired by fitting the two surfaces perpendicular to each other, and a third dimension is acquired by measuring the position relationship of the plurality of multi-line laser radars.

Embodiments of the present disclosure also provide a container positioning apparatus based on multi-line laser data fusion using the container positioning method based on multi-line laser data fusion described above.

In summary, the container positioning method and apparatus based on multi-line laser data fusion provided in the present embodiment can acquire point cloud data of at least two multi-line laser radars and perform point cloud data fusion, perform scanning line clustering according to the fused point cloud data and acquire edge points and contours of the top surface or the side surface of the target container, so as to determine the central point and the heading angle of the target container, and then determine the position of the target container, thereby achieving accurate positioning of the target container.

Further, depending on the length, width, and height of the target container, and the single-sided edge point of the top surface and the contour of the top surface or the edge point of the side surface and the contour of the side surface of the target container, accurate positioning of the target container can be achieved when the top surface of the target container is partially or completely unavailable.

Further, at least two multi-line laser radars are angled to enable scanning of the target container from a lateral direction and a longitudinal direction, respectively, so that edge points and contours of the target container are completely scanned, enabling accurate positioning of the target container.

Although the present disclosure has been described with reference to the preferred embodiments, it is not intended to be limited. A person skilled in the art, without departing from the spirit and scope of the present disclosure, can make changes and improvements, and thus the scope of protection of the present disclosure shall be defined by the claims.

The invention claimed is:

1. A container positioning method based on multi-line laser data fusion, comprising:
    acquiring point cloud data of at least two multi-line laser radars, and performing point cloud data fusion according to a coordinate system relationship between the at least two laser radars;
    performing clustering of scanning lines according to the fused point cloud data, and acquiring an edge point of a top surface or a side surface of a target container according to the clustered scanning lines;
    acquiring a contour of the top surface or the side surface of the target container according to the edge point of the top surface or the side surface of the target container to determine a central point and a heading angle of the target container so as to determine a position of the target container;
    the clustered scanning lines intersecting with a long side of the top surface of the target container to obtain a first group of edge points and/or a second group of edge points, the clustered scanning lines intersecting with a short side of the top surface of the container to obtain a third group of edge points and/or a fourth group of edge points, the first group of edge points and/or the second group of edge points being at least two, and the third group of edge points and/or the fourth group of edge points being at least one;
    calibrating the at least two multi-line laser radars, the at least two multi-line laser radars respectively scanning two surfaces, perpendicular to each other, of the target container, obtaining two dimensions of a rotation relationship and a displacement relationship of the at least two multi-line lasers by fitting the two surfaces perpendicular to each other, and obtaining a third dimension by measuring a position relationship of the at least two multi-line laser radars.

2. The container positioning method based on multi-line laser data fusion according to claim 1, wherein
    a contour of the top surface of the target container is acquired according to a length, width, height of the target container and the data points of a single-sided edge of the top surface of the target container when part of the top surface of the target container is unable to obtained; and
    a contour of the side surface of the target container is acquired according to the width, length, height of the target container and the edge point of the side surface of the target container when entire of the top surface of the target container is unable to obtain.

3. The container positioning method based on multi-line laser data fusion according to claim 1, wherein
    when the at least two multi-line laser radars scan contours of a plurality of containers, a position of the target container is determined according to a general position and a floor height where the target container is located.

4. The container positioning method based on multi-line laser data fusion according to claim 1, further comprising:
    selecting a point cloud region of interest according to a pre-estimated position of the target container, and removing point cloud data not hit on the target container; and
    clustering the point cloud data in a region of the point cloud ROI according to a width, length and height of the target container to obtain a laser line hitting the top surface or the side surface of the target container in the region of the point cloud ROI.

5. The container positioning method based on multi-line laser data fusion according to claim 1, wherein the first group of edge points and/or the second group of edge points are fitted with a straight line to obtain the heading angle of the target container or the seventh group of edge points are fitted with a straight line to obtain the heading angle of the target container.

6. The container positioning method based on multi-line laser data fusion according to claim 1, wherein the at least two multi-line laser radars are three-dimensional laser radars mounted on a cart.

7. The container positioning method based on multi-line laser data fusion according to claim 1, wherein the at least two multi-line laser radars are angled with each other to enable scanning of the target container from a lateral direction and a longitudinal direction, respectively.

8. A container positioning apparatus based on multi-line laser data fusion, using the container positioning method based on multi-line laser data fusion according to claim 1.

* * * * *